June 11, 1929.  J. B. AUSTERMANN  1,716,410
HORSESHOE
Filed March 8, 1928
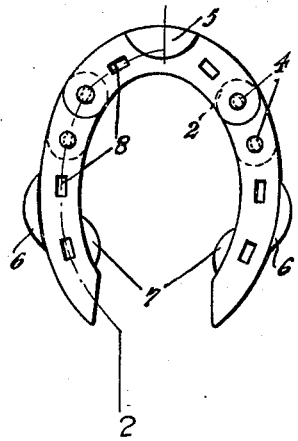
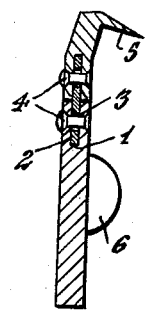
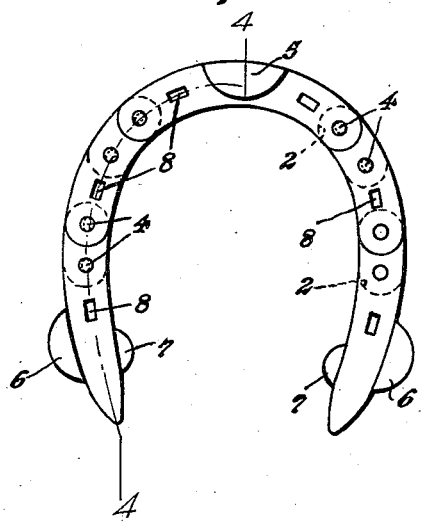
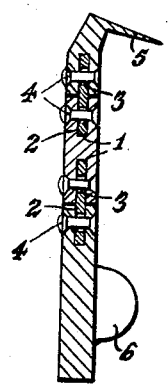
INVENTOR
J. B. AUSTERMANN Patented June 11, 1929.

1,716,410

UNITED STATES PATENT OFFICE.

JOSEF BERNARD AUSTERMANN, OF TJIPANAS, GAROET, DUTCH EAST INDIES.

HORSESHOE.

Application filed March 8, 1928, Serial No. 260,198, and in the Netherlands July 22, 1925.

The usual horseshoes have the disadvantage of being rigid and—though they protect the hoof against wearing off—they cannot follow all movements of same, so that the horse does not walk as freely as would be possible in case the hoofs were unprotected. This is a great drawback, especially on slippery roads, on which a horse being shod with rigid shoes, can hardly keep its footing.

To meet this difficulty horseshoes have been proposed, composed of a plurality of parts, hingedly connected in such a way that they can only pivot with respect to each other in the plane of the shoe. However, such horseshoes do not meet the requirements, because they cannot follow the natural movements of the hoof. For in case of a sudden stop or slip, the hoof is placed on the ground its back parts first and so tries to find a support on the road. In that case the back walls of the hoof give way and work themselves into the ground, while the frog goes down and likewise supports on the ground. It is necessary that the horseshoe be in a position to follow and to support said movements and of course likewise the reversed movements when the hoof is lifted. So the parts must not only be capable to hinge with respect to each other in the plane of the horseshoe, but they should be connected to each other in such a way that a small lengthening and shortening of the horseshoe is possible.

According to the invention the hinge joints of a horseshoe as described above are constructed in such a way that the parts are able to slide somewhat with respect to each other in the direction of the outline of the horseshoe.

Further according to the invention the parts can be connected by means of small plates, arranged in slots made in the adjacent ends of the parts, such plates being provided with oblong openings, through which pass the hinge pins rigidly attached in the ends of the parts.

Fig. 1 is a view of a tripartite horseshoe;

Fig. 2 is a longitudinal section of the same on line 2—2, Fig. 1;

Fig. 3 is a view of a quinquepartite horseshoe; and

Fig. 4 is a longitudinal section of same on line 4—4, Fig. 3.

In the embodiment according to Figs. 1 and 2 the horseshoe comprises three parts hingedly connected to each other. The adjacent ends of these parts have slots 1, while plates 2 are arranged in said slots. The plates 2 are provided with oblong openings 3 and the hinge pins 4 which are rigidly attached in the ends of the parts pass through said openings. This joint enables the parts of the horseshoe to slide a small extent with respect to each other in the direction of the outline of the horseshoe. Further the shoe is connected to the hoof by means of supports or clips 5, 6 and 7 at the front side and at the outer back sides and the inner back sides of the shoe, and further by nails passing through the holes 8.

The embodiment according to Figs. 3 and 4 comprises five parts.

Moreover the horseshoe may be composed of more parts.

I claim:

A horseshoe comprising a plurality of sections, the sections having slots in their adjacent meeting ends, plates fitting in the slots of the adjacent sections, the plates having elongated openings near the ends, and pins extending through the sections and slots, whereby to hingedly connect the sections and plates to permit said sections to slide slightly with reference to each other in the direction of the outline of said shoe.

In testimony whereof I affix my signature.

JOSEF BERNARD AUSTERMANN.